(12) United States Patent
Kop et al.

(10) Patent No.: US 11,589,593 B2
(45) Date of Patent: Feb. 28, 2023

(54) OVEN WITH IMPROVED DRAG

(71) Applicant: GEA Food Solutions Bakel B.V., Bakel (NL)

(72) Inventors: Ben Kop, Esch (NL); Paul Verbruggen, Helmond (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 738 days.

(21) Appl. No.: 15/775,071

(22) PCT Filed: Nov. 15, 2016

(86) PCT No.: PCT/EP2016/077744
§ 371 (c)(1),
(2) Date: May 10, 2018

(87) PCT Pub. No.: WO2017/085064
PCT Pub. Date: May 26, 2017

(65) Prior Publication Data
US 2018/0368423 A1    Dec. 27, 2018

(30) Foreign Application Priority Data

Nov. 17, 2015  (EP) .................................. 15194963

(51) Int. Cl.
*A21B 1/00*     (2006.01)
*A23L 5/00*     (2016.01)
(Continued)

(52) U.S. Cl.
CPC ................. *A21B 1/48* (2013.01); *A21B 1/36* (2013.01); *A21B 3/02* (2013.01); *A23L 5/17* (2016.08);
(Continued)

(58) Field of Classification Search
CPC ....... B65G 47/086; B21B 39/006; A21B 1/48; A21B 1/36; A23L 5/17; F27B 9/3005; F27B 9/40
See application file for complete search history.

(56) References Cited

U.S. PATENT DOCUMENTS 4,167,585 A    9/1979   Caridis et al.
4,726,766 A    2/1988   Stewart et al.
(Continued)

FOREIGN PATENT DOCUMENTS

CA    2831287 A1    10/2012
CN    2302658 Y    1/1999
(Continued)

OTHER PUBLICATIONS

Russian Office Action for Russian Patent Application No. 2018 121 345; dated Apr. 10, 2020.
(Continued)

*Primary Examiner* — Ericson M Lachica
(74) *Attorney, Agent, or Firm* — The Dobrusin Law Firm, P.C.

(57) ABSTRACT

The present invention relates to an oven comprising: —a first chamber and a second chambers, which are separated by separation means—conveyor means for guiding products from the inlet through these chambers to the outlet, —temperature control means for controlling the temperature and/or humidity in each chamber individually using a fluid, respectively, and—a passage in the separation means through which the conveyor means are directed from the first chamber to the second chamber.

21 Claims, 3 Drawing Sheets

Figure 1:
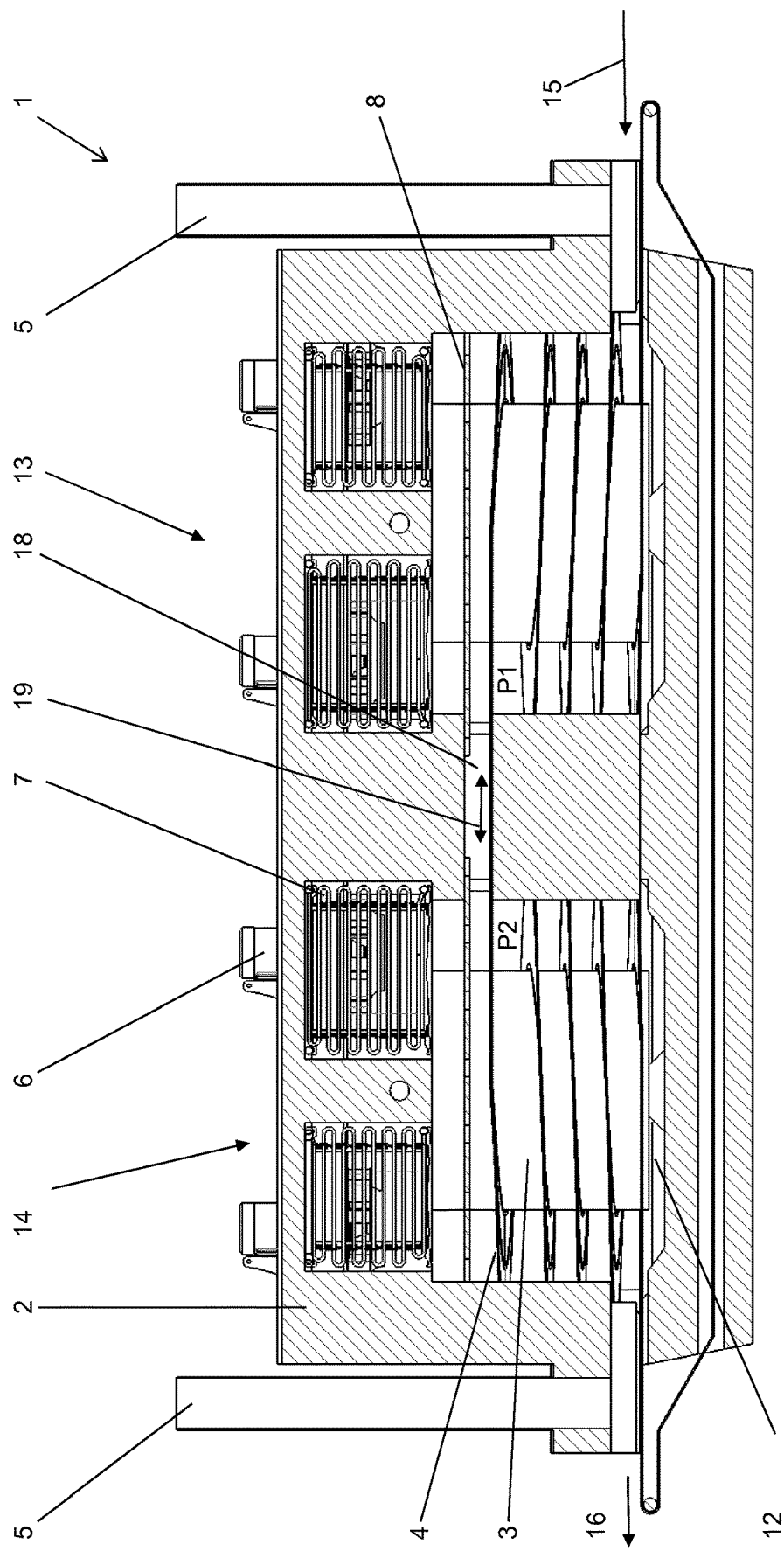

(51) Int. Cl.
    *F27B 9/00*          (2006.01)
    *A21B 1/48*         (2006.01)
    *A23L 5/10*          (2016.01)
    *A21B 1/36*         (2006.01)
    *A21B 3/02*         (2006.01)
    *F27B 9/30*          (2006.01)
    *F27B 9/40*          (2006.01)

(52) U.S. Cl.
    CPC .............. *F27B 9/3005* (2013.01); *F27B 9/40* (2013.01); *A23V 2002/00* (2013.01)

(56) References Cited

U.S. PATENT DOCUMENTS

| | | | |
|---|---|---|---|
| 5,078,120 | A | 1/1992 | Hwang |
| 5,329,916 | A * | 7/1994 | Lygum .................... A21B 1/48 432/128 |
| 2005/0092312 | A1 | 5/2005 | Gunawardena et al. |
| 2007/0298148 | A1 | 12/2007 | Van Der Eerden et al. |
| 2011/0084056 | A1 | 4/2011 | Kuenen |
| 2011/0226137 | A1* | 9/2011 | van der Eerden ....... A21B 1/48 99/477 |
| 2013/0004639 | A1 | 1/2013 | McVeagh et al. |
| 2013/0220145 | A1 | 8/2013 | Ros et al. |

FOREIGN PATENT DOCUMENTS

| | | |
|---|---|---|
| DE | 3339936 A1 | 7/1984 |
| EP | 0558151 A1 | 9/1993 |
| EP | 0558151 B1 | 1/1996 |
| EP | 0558151 B2 | 1/2001 |
| EP | 1221575 A1 | 7/2002 |
| EP | 2110020 A1 | 10/2009 |
| EP | 1221575 B2 | 9/2010 |
| RU | 2504155 C2 | 1/2014 |
| WO | 91/11660 A1 | 8/1991 |
| WO | 2008/008305 A1 | 1/2008 |

OTHER PUBLICATIONS

Vaisala, Dew Point in Compressed Air, Dated 2013.
Notice of Opposition for Application No. 16795357.9, dated Oct. 13, 2020.
International Search Report and Written Opinion for International Application No. PCT/EP2016/077744; dated Dec. 14, 2016.
International Preliminary Report on Patentability for International Application No. PCT/EP2016/077744; dated Feb. 16, 2018.

* cited by examiner

OVEN WITH IMPROVED DRAG

The present invention relates to a method for operating an oven comprising:
- a first and a second chamber in which a heated fluid cooks a product, respectively
- conveyor means for transporting products from an inlet through the chambers to the outlet, wherein preferably the conveyor means are at least partially arranged in a helical path,
- separation means to separate the first and second chamber, wherein the conveyor means pass through the separation means.

The present invention also relates to an oven to cook products.

An oven of this type is for example known from EP 1 221 575 A1 and EP 0 558 151A1 and is suitable for the complete or partial cooking of edible products, especially protein containing products, like chicken, hamburgers, cordon bleu etc. The above-mentioned patent applications are herewith included by reference and are therefore part of the disclosure of the present patent application. The ovens according to the state of the art comprise one or more chambers in which different cooking conditions can be set, e.g. the fluid that is utilized to cook the product, preferably air and/or water-steam or water vapor, can have a different dry bulb temperature and/or a different dew-point temperature. There is a constant desire of the person skilled in the art to improve the energy- and/or cooking-efficiency of such ovens.

The problem is solved by method for operating an oven comprising:
- a first and a second chamber
- conveyor means for transporting products from an inlet through the chambers to the outlet, wherein preferably the conveyor means are at least partially arranged in a helical path,
- separation means to separate the first and second chamber, wherein the conveyor means pass through the separation means wherein, a pressure difference is established between the fluid in the first and the fluid in the second chamber preferably in the vicinity of the separation means.

The disclosure made regarding the inventive method also applies to the inventive oven and vice versa.

Due to the pressure differential, the amount of fresh air intake, for example through the inlet and/or the outlet of the oven, into the respective chambers can be controlled. It can be controlled in which chamber and/or chambers the fresh air intake takes place and the amount and the amount per time unit. Furthermore, the direction and the amount of drag through the opening in the separation means between the two chambers can be adjusted. The pressure difference can also be controlled such that there is no drag between the two chambers.

The oven in which the inventive method is utilized, comprises at least two chambers. In one chamber the product inlet is preferably provided and in another chamber, preferably the product outlet is located. The chambers are preferably equal in size. In each chamber, there is a fluid, preferably air and/or water vapor, that is heated by a heater and adjusted to a certain dry-bulb temperature. The fluid heats products to be cooked by conduction and convection. The fluid is preferably circulated in each chamber, individually Preferably, there is at least one heater per chamber, which can be operated individually, so that the dry-bulb temperature in each chamber can be adjusted individually. The dew-point temperature of the gas in each chamber may be equal or different. Each chamber may comprise an individual dew-point temperature that may be equal or different. By means of an inlet for a gas, preferably air, with a dew-point temperature lower than the fluid in the respective chamber and/or a fluid, preferably steam, with a dew-point temperature higher than the fluid in the respective chamber, the dew-point temperature in the respective chamber can be influenced.

The oven further comprises conveyor means for moving products from an inlet of the oven through the chambers to an outlet. The conveyor means in each chamber are preferably arranged in a helical path. The two helical paths are preferably connected by a straight section. The conveyor means are preferably an endless conveyor belt, which, more preferably, is at least partially permeable for the process fluid. Preferably, the conveyor means are operated continuously.

According to the invention, the two chambers are separated from each other by separation means, so that different conditions in terms of dry-bulb temperature and/or humidity/dew-point temperature can be set in the two chambers. The separation is for example a wall between the two chambers which is preferably sealed, more preferably hermetically sealed, against the housing of the oven. However, there is an opening/passage in the separation means, through which the conveyor means pass. Preferably, the conveyor means pass the separation means with its straight section. Preferably, the separation means is insulated to reduce the heat transfer between the two chambers. The passage may be just an opening in the separation means or a duct that extends into at least one, preferably both chambers or connects two chambers.

The oven preferably comprises dry-bulb-temperature- and/or humidity/dew-point temperature control means for controlling the dry-bulb-temperature and/or humidity/dew-point temperature of the fluid in each chamber, respectively. The dry-bulb temperature of the fluid is adjusted by a heater/cooler, preferably at least one heater/cooler per chamber which can be adjusted individually. The humidity/dew-point temperature of the fluid is adjusted by adding steam or other fluid, preferably air with a low humidity/dew-point temperature as described above.

According to the present invention, a pressure difference is established/adjusted on purpose between the fluid in the first and the fluid in the second chamber in the vicinity of the separation means to influence the exchange of fluid between the two chambers. Due to this pressure difference, preferably a fluid flow is induced, preferably through the separation means, preferably through the conveyor passage in the separation means, the so called drag. However, the pressures in the two chambers, preferably in the vicinity of the opening in the separation means, can also be adjusted such that the pressure difference is zero or almost zero and hence no gas exchanges between the two chambers.

The pressure difference between the two chambers can be accomplished by injecting a fluid, for example air and/or steam under pressure into at least one chamber. The pressure difference can also be accomplished by sucking a fluid, preferably air, with a relatively low dew-point temperature in one chamber and heat it up. This steam and/or air can also be utilized to adjust the dew-point temperature in the respective chamber.

Alternatively, or additionally, the pressure difference can be accomplished by sucking an exhaust-gas-stream out of one at least one chamber.

Alternatively, or additionally, the pressure difference can be accomplished by a density difference of the fluid in the two chambers. The density can be changed by changing the dry-bulb temperature and/or the dew-point temperature of the fluid in the respective chamber.

Additionally, or alternatively, each chamber comprises a fluid circulation means, for example at least one fan, which recirculates the fluid in the respective chamber, normally a mixture of air and water vapor. The means are preferably provided in at least one preferably each chamber. At least one of the means in one chamber, preferably in both chambers can be controlled individually. The recirculation means removes fluid from the chamber and blows it back in, preferably past a heater. Due to this recirculation, there is a fluid-motion at a certain average speed in each chamber that improves the heat-transfer from the fluid to the product and/or reduces dry-bulb temperature- and/or humidity/dew-point temperature-differences in each chamber, respectively. However, it has been found out that this recirculation means also influences the pressure in the chamber, preferably in the vicinity of the separation means by changing the average recirculation speed of the fluid in each chamber. This pressure difference can be utilized to influence the drag between the two chambers.

In case the circulation means is a fan, the average recirculation speed can be changed by changing the rpm of the fan.

Preferably, the recirculation rate of the fluid is at least temporarily different in the two chambers, i.e. one recirculation means, e.g. fan, recirculates more fluid than the others and/or the average velocity of the fluid in one chamber is higher than the average velocity in the other chamber, so that a pressure differential in the fluid in the respective chambers is established preferably in the vicinity of the separation means, preferably in the vicinity of the conveyor passage. According to another preferred aspect of the present invention, the speed of rotation of at least one of the fan is set such that the flow across the separation means is reduced, preferably to zero.

Preferably, by setting the pressure differential of the fluid in two adjacent chambers, for example by setting this difference in the recirculation rates, the chamber with the higher flow rate drags the fresh air into the oven, preferably through the inlet or the outlet of the oven and no or less air is dragged into the chamber with the lower flow rate of the recirculation flow. More preferably, a drag which can take place between the chambers via the opening for the conveyor in the separation means, can be adjusted, e.g. increased or decreased. It can be adjusted to a certain flow rate and/or it can be reduced to zero. Also, the direction of the drag can be adjusted by adjusting the difference of the recirculation rate of the fluid in the respective chamber. Preferably, the direction of the drag is from the chamber with the higher recirculation flow rate to the chamber with the lower flow rate of the recirculation flow, particularly in case the dry-bulb temperatures in both chambers are at least essentially equal.

Preferably, the dew-point temperature of the fluid in the respective chamber is adjusted by adjusting the pressure differential of the fluid in two adjacent chambers, for example, the difference between the recirculation rate in the respective chambers. The chamber with the higher recirculation rate has preferably the lower dew-point temperature, particularly in case the dry-bulb temperatures are at least essentially equal. Preferably, the dew-point temperature of the chamber with the lower recirculation rate is higher, particularly in case the dry-bulb temperatures in both chambers are at least essentially equal.

According to a preferred embodiment of the present invention, the chamber furthest downstream, relative to the product flow direction, has the highest recirculation rate, i.e. the highest fluid speed is inside this chamber, particularly in case the dry-bulb temperatures in both are at least essentially equal. This preferably may result in a lower dew-point temperature of the fluid in this chamber because more fresh air can be sucked or blown in and hence for example an improved browning and/or drying is achieved. More preferably, the chamber further upstream has a lower recirculation rate, i.e. the lowest average fluid speed is inside this chamber. This preferably may result in a higher dew-point temperature of the fluid in this chamber, particularly in case the dry-bulb temperatures in both chambers are at least essentially equal. The drag takes place, preferably from the chamber with the fluid with the lower dew point temperature to the chamber with the fluid with the higher dew-point temperature. Preferably, the drag is in counter-flow to the transport direction of the product.

According to another preferred embodiment of the present invention, the chamber furthest downstream, relative to the product flow direction, has the lowest recirculation rate, i.e. the lowest fluid speed is inside this chamber, particularly in case the dry-bulb temperatures in both are at least essentially equal The inventive method can be used to control the cooking process of a product. Conventionally, there is a recipe to cook and/or brown a product. This recipe includes the dry-bulb temperature and the dew-point temperature per chamber and may include the average recirculation rate, e.g. fan speed, of the fluid, preferably air and steam, in each chamber. The pressure, preferably the static pressure, in at least one chamber, preferably in both chambers and/or the drag, i.e. the gas flow from one chamber to the other is measured. In case this flow or the pressure difference deviates from a desired value, the pressure difference between the two chambers can be influenced. This can be done by changing the dry bulb temperature and/or the dew-point temperature of the fluid in at least one chamber and/or by changing the internal average speed of the fluid in at least one chamber. The change of the dew point temperature can be done by injecting steam to increase the dew-point and/or by providing gas with a lower dew-point to the respective chamber.

This method can be carried out automatically.

According to a preferred embodiment of the present invention, an exhaust fluid stream is produced within the inventive method. More preferably, the exhaust fluid is utilized to pre-heat the product, more preferably in a channel upstream from the oven. Hence, the heat capacity of the exhaust fluid is utilized to preheat the product and/or to moisten the product before it enters the oven.

Another embodiment of the present invention is an oven comprising:
- a first and a second chamber and at least one heater to heat a fluid which cooks a product,
- conveyor means for transporting products from an inlet through the chambers to the outlet, wherein preferably the conveyor means are at least partially arranged in a helical path,
- separation means to separate the first and second chamber, wherein the conveyor means pass through the separation means,
- wherein the oven comprises means to establish a pressure difference between the fluid in the first and the fluid in the second chamber in the vicinity of the separation means.

The disclosure made regarding the inventive oven also applies to the inventive method and vice versa.

The means can be a steam- or air injection and/or sucking of gas, preferably air, that is heated up in the oven and/or a density difference of the fluid in two adjacent chambers, preferably in the vicinity of the separation means, respectively. The means can also be a ventilator sucking an exhaust gas out of at least one chamber. However, as already explained above, the means can also be a difference in the recirculation fan speed in the adjacent chambers.

Preferably, the oven comprises means to measure a flow-rate of a drag between the first and the second chamber and/or the pressure in each chamber and that the signal of this measurement is utilized to control a means which recirculates a fluid in the respective chamber and/or the inlet of fresh gas and/or steam. Preferably, the means which recirculates the fluid in a chamber is a fan. Preferably the rpm of this fan is controlled in order to change the pressure in the respective chamber.

Subsequently, the invention is now explained according to the attached figures. These explanations do not limit the scope of protection.

Figure 2:
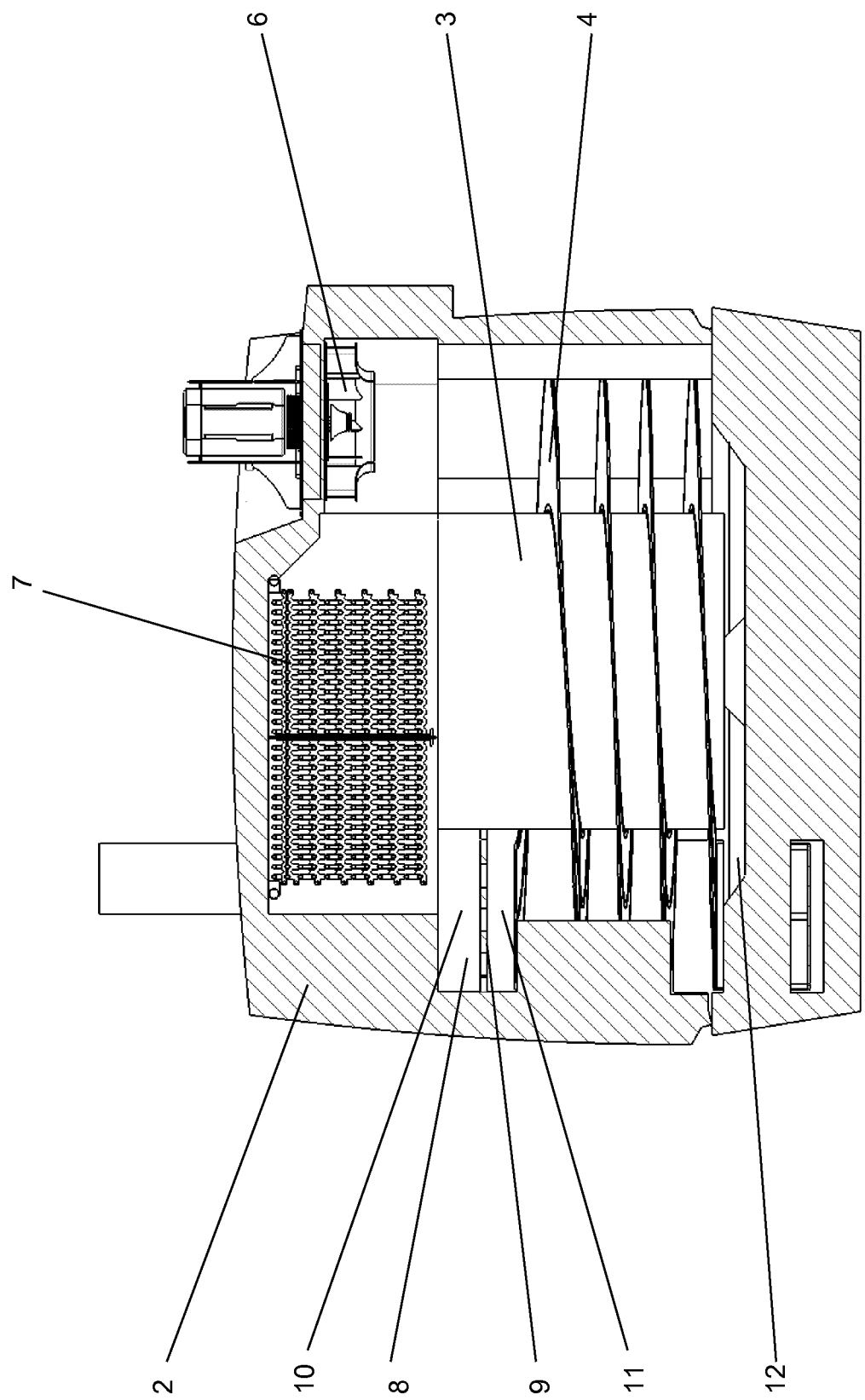
Figure 3:
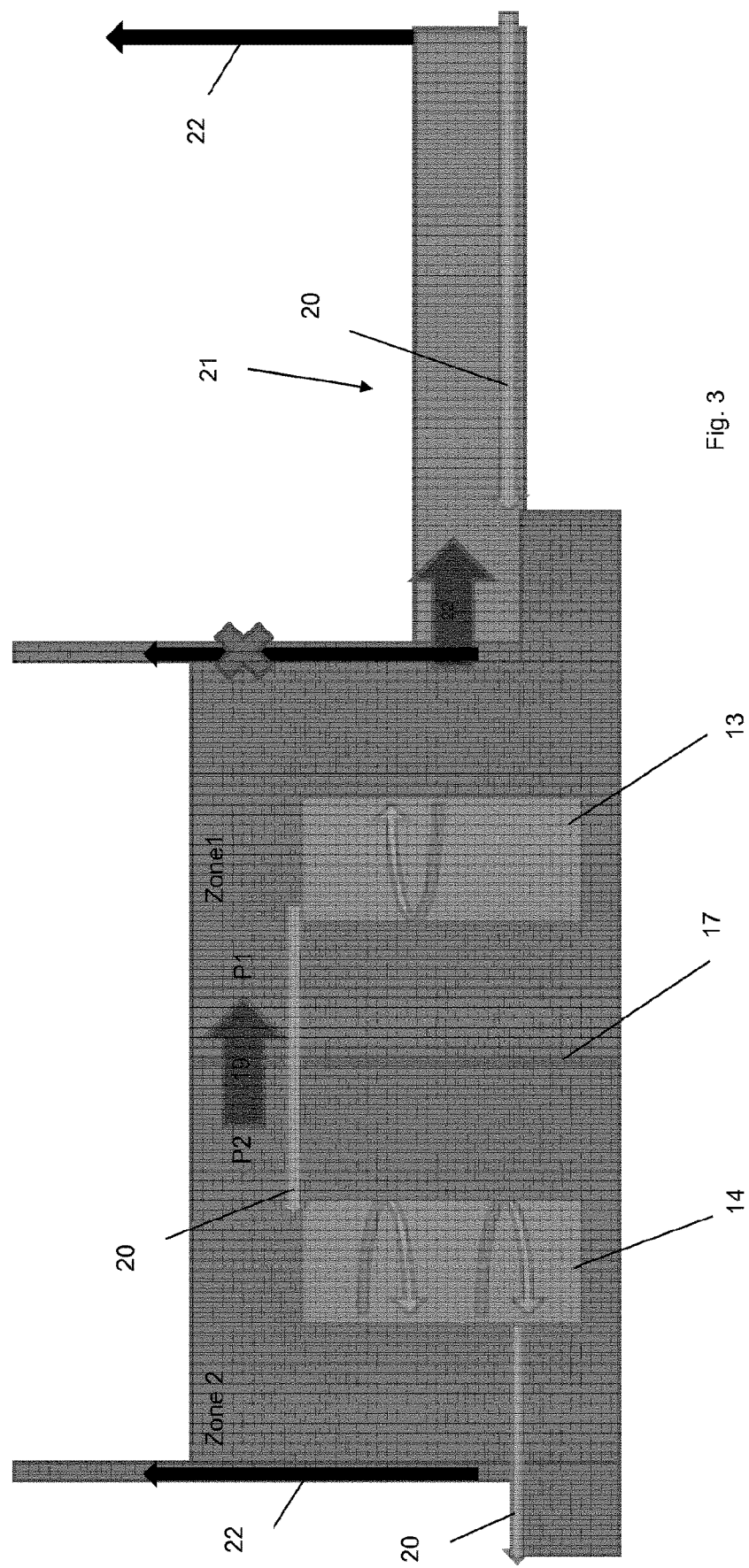

FIGS. 1-3 show an embodiment of the inventive method.

FIGS. 1-3 show the oven in which the inventive method is utilized. The oven 1 comprises a first chamber 13 and a second chamber 14. The chambers are divided by means of a separation means 17, for example a metal wall, preferable an insulated separation means, which is sealed against the housing 2 of the oven. The oven comprises conveyor means 4, which transport the products to be cooked through the oven. The conveyor means 4 are here utilized by a helical transport belt in each chamber 13, 14. Therefore, here a rotatable drum 3 is arranged in each of these chambers, around which the conveyor belt 4 is guided along the helical paths. The endless conveyor belt enters the oven 1 via the inlet 15 in the housing 2, preferably by a straight conveyor belt section and leaves the oven 1 via the outlet 16 in the housing, likewise preferably by means of a straight section. The two helical sections are preferably connected by the straight conveyor belt section, which lies here at the top. The belt is preferably permeable to the process fluid, e.g. air and steam. The separation means 17 comprise a passage 18 for the belt section between the two helical paths. The conveyor means are preferably operated continuously.

The fluid in the oven, preferably a mixture of air and vapor, is heated by heating means, which are overall denoted by 7, which are here arranged in the top of the housing. There is preferably one heating means per chamber, which, more preferably can be controlled individually. These heating means 7 each comprise a recirculation means, here at least one fan 6. Here, there are two recirculation means per chamber 13, 14, even though the person skilled in the art understands that one recirculation means per chamber may be sufficient. The recirculation means in at least one chamber, preferably in both chambers whose fluid flow rate can be adjusted individually. The fluid, is sucked up by the fans 6 from each chamber 13, 14 and forced back into the same chamber, 13, 14 from which it has been taken. The fluid here flows past the heating elements 7 and is then recycled into the respective chamber 13, 14. Prior to the reintroduction of the fluid into the respective chamber, the fluid flow may be distributed according to a desired pattern by distribution means 9, for example a holed plate. The pressure 10 upstream from the distribution means is higher than the pressure 11 downstream from the distribution means 9. The moisture/dew-point temperature of the fluid in the chamber can be adjusted by a water bath 12 provided in one or both chambers and/or by the addition of steam. In the two chambers 13, 14 different dry-bulb temperature- and/or humidity/dew-point temperature conditions can be set.

Reference is now particularly made to FIG. 3. The product enters the oven in the first chamber 13 passes from the first to the second chamber 14 and then leaves the oven via the outlet. The product flow is indicated with reference sign 20. The first chamber 13 preferably has a higher dew-point temperature than chamber 14. The dry-bulb temperatures can be equal or different in both chambers.

According to the present invention, the pressure P1 of the fluid adjacent to the separation means in chamber 14 is different from the pressure P2 of the fluid adjacent to the separation means in chamber 13. In the present case P2 is larger than P1. Due to this pressure difference, there is a fluid flow 19 from chamber 14 to chamber 13. In the present case, this pressure difference is achieved by a difference in the recirculation rate, e.g. average speed of the fluid in chamber 13 and 14, i.e. the recirculation means 6 in each chamber 13, 14 are set such, that the flow rate of the recirculation flow, preferably its average velocity, is adjusted differently in the chambers 13 and 14. The recirculation rate can be higher or lower in chamber 14 than in chamber 13. Due to the pressure difference, fresh air is only drawn into chamber 14, for example via outlet 16 or an opening provided for fresh air intake. Additionally, and/or preferably, the drag 19 between the two chambers via opening 18 is directed from the second chamber 14 to the first chamber 13, i.e. in counter-flow to the product. Normally, an exhaust fluid is produced in the oven, this exhaust fluid is vented to the ambient preferably in the vicinity of the inlet 15 and/or further upstream as explained later on. No or essentially no fresh air is dragged into chamber 13. Hence the dew-point temperature in chamber 14 is lower than in chamber 13. Exhaust fluid can also vented to the ambient at the outlet as depicted by arrow 22. In order to reduce the energy consumption of the inventive method, the exhaust fluid at the inlet of the oven can be utilized to transfer heat to the product in a preheating zone 21, upstream from the oven 1. This preheating preferably takes place in a separate pre-heating zone, preferably with no recirculation. The exhaust fluid flows, preferably in counter flow to the product and is then vented to the ambient as depicted by arrow 22 at the inlet of preheating zone 21.

The pressure difference can also be accomplished by injecting a fluid, for example air and/or steam under pressure into at least one chamber. The pressure differential can also be accomplished by sucking a fluid, preferably air, in and heat it up. This steam and/or air can also be utilized to adjust the dew-point temperature in the respective chamber.

Alternatively, or additionally, the pressure difference can be accomplished by sucking an exhaust-gas-stream out of one at least one chamber.

Since no or little fresh air is drawn into chamber 13, no extra air needs to be heated up and the addition of vapor/steam to this chamber can be reduced. A moisture difference between the two chambers can be maintained more easily. The drag is in a direction as desired. And the exhaust is at least mainly removed from the oven at the inlet or upstream from the inlet. All this can be achieved by a difference in the magnitude of the recirculation flow in the respective chambers 13, 14.

The invention is now further explained by an example. Reference is made to the oven as described according to FIGS. 1-3, particularly FIG. 3. The dry bulb temperature is identical in both chambers. A product enters the product at the entrance of zone 1, wherein the preheating zone is not necessarily existent. The speed of the gas in zone 1 and zone 2 is initially identical. A certain dew-point-temperature difference establishes, wherein the dew-point in zone 1 is significantly higher than in zone two. The static pressure in zone 1 is lower than in zone 2. This results in a drag from zone 2 to zone 1 and hence may result in an intake of fresh air e.g. through the product exit 20. In order to reduce this drag and/or in order to reduce the dew-point temperature difference between the two zones, the speed of the gas in zone two is decreased, which results in a reduction of pressure differential and consequently in a reduction of the drag between the two zones. By changing the speed of the gas in the respective zones, for example by changing the rpm of the fan, it is even possible to reverse the drag.

Alternatively, or additionally, steam or fresh air can be injected in one or both chambers to increase or decrease the pressure difference, while the speed of the gas is maintained constant to influence the drag between the two zones.

By these means it is possible to change a recipe slightly for example to improve the energy efficiency of the cooking process.

REFERENCE SIGNS

1 Oven
2 Housing
3 Drum
4 Conveyor means, Helical transport belt
5 Exhaust chimney
6 Circulation means, circulation fans
7 Heating element, heating means
8 Air guide
9 Distribution means, holes plate
10 Higher pressure
11 Lower pressure
12 Water bath
13 First chamber
14 Second chamber
15 Intel
16 Outlet
17 Separation means
18 Opening, passage
19 Drag
20 Product flow
21 Preheating zone
22 Exhaust-fluid
P1-P2 Pressure difference

The invention claimed is:

1. A method for operating an oven comprising a first chamber and a second chamber, the method comprising:
cooking a product in the first chamber and in the second chamber with a heated fluid,
transporting the product with a conveyor means in a transporting direction, from an inlet of the oven, through the first chamber and the second chamber, to an outlet of the oven, the conveyor means are at least partially arranged in a helical path,
wherein the oven comprises a separation means to separate the first chamber and the second chamber, the conveyor means pass through the separation means,
wherein the method comprises establishing a pressure difference or establishing and reducing the pressure difference between the heated fluid in the first chamber and the heated fluid in the second chamber in a region of the separation means,
wherein the method comprises adjusting a dewpoint of the heated fluid in the first chamber and in the second chamber by adjusting a recirculation rate of the heated fluid in the first chamber and in the second chamber,
wherein the dewpoint of the heated fluid is lower in the first chamber than in the second chamber, and the first chamber has a higher recirculation rate than the second chamber, and
wherein the first chamber is located further downstream than the second chamber, relative to the transporting direction of the product through the oven.

2. The method according to claim 1, wherein the separation means comprises a passage, and the pressure difference is established between both sides of the passage in the separation means.

3. The method according to claim 1, wherein one circulation means is provided in each of the first chamber and the second chamber, which recirculates the heated fluid in each of the first chamber and the second chamber at a flow rate, and
wherein the flow rate is at least temporarily different in at least one of the first chamber and the second chamber to establish or reduce the pressure difference between the first chamber and the second chamber.

4. The method according to claim 1, wherein the method comprises:
i) forming the heated fluid by injecting a fluid into at least one of the first chamber and the second chamber and then heating the fluid, and/or
ii) forming the heated fluid by sucking the fluid into at least one of the first chamber and the second chamber, and then heating the fluid, and/or
iii) establishing a density difference between the heated fluid in the first chamber and the second chamber, and/or
iv) sucking an exhaust-gas out of at least one of the first chamber and the second chamber to establish or reduce the pressure difference between the first chamber and the second chamber.

5. The method according to claim 1, wherein a drag is induced between the first chamber and the second chamber, and
wherein an amount of the drag is controlled by the pressure difference.

6. The method according to claim 1, wherein air is dragged into one of the first chamber and the second chamber.

7. The method according to claim 6, wherein the air is dragged into the first chamber which has the higher recirculation rate than the second chamber, and an amount of the air is adjusted by adjusting a difference between the recirculation rate in the first chamber and the second chamber.

8. The method according to claim 1, wherein a drag is in counter-flow to the transporting direction of the product.

9. The method according to claim 1, wherein the oven comprises an exhaust fluid stream.

10. The method according to claim 9, wherein the exhaust fluid stream is utilized to pre-heat the product.

11. The method according to claim 1, wherein the method comprises inducing the heated fluid to flow between the second chamber and the first chamber by creating the pressure difference between the second chamber and the first chamber.

12. The method according to claim 11, wherein the method comprises drawing air into the second chamber.

13. The method according to claim 12, wherein the method is free of any steps of drawing air into the first chamber.

14. The method according to claim 11, wherein the method comprises creating the pressure difference between the first chamber and the second chamber by: forming the heated fluid by injecting a fluid into at least one of the first chamber and the second chamber and then heating the injected fluid; sucking an exhaust gas steam out of at least one of the first chamber and the second chamber; creating a density difference of the heated fluid in at least one of the first chamber and the second chamber; changing the recirculation rate of the heated fluid in at least one of the first chamber and the second chamber; or a combination thereof.

15. The method according to claim 1, wherein the method comprises sucking the heated fluid from inside the first chamber and/or inside the second chamber by recirculating means and then forcing the heated fluid back into the same first chamber and/or the second chamber.

16. The method according to claim 15, wherein prior to the step of forcing the heated fluid back into the same first chamber and/or the second chamber, the method comprises distributing the heated fluid according to a pattern by distributing means.

17. The method according to claim 1, wherein the separation means is a metal wall, and
wherein the method comprises reintroducing the heated fluid into the first chamber or into the second chamber, and prior to the reintroducing step, the method comprises: distributing the heated fluid according to a pattern by a distribution means, wherein the distribution means comprises a plate with holes; and wherein the pressure of the heated fluid upstream from the distribution means is higher than the pressure of the heated fluid downstream of the distribution means.

18. A method for controlling an oven comprising a first chamber and a second chamber, the method comprising:
cooking a product in the first chamber and in the second chamber with a heated fluid,
transporting the product with a conveyor means in a transporting direction, from an inlet of the oven, through the first chamber and the second chamber, to an outlet of the oven, the conveyor means are at least partially arranged in a helical path,
wherein the oven comprises a separation means to separate the first chamber and the second chamber, the conveyor means pass through the separation means,
wherein a pressure difference between the heated fluid in the first chamber and the heated fluid in the second chamber in a vicinity of the separation means is controlled,
wherein the method comprises adjusting a dewpoint of the heated fluid in the first chamber and in the second chamber by adjusting a recirculation rate of the heated fluid in the first chamber and in the second chamber, and
wherein the first chamber has a higher recirculation rate than the second chamber and is located further downstream than the second chamber, relative to the transporting direction of the product through the oven.

19. The method according to claim 18, wherein a recirculation rate of gas in one of the first chamber and the second chamber is controlled.

20. The method according to claim 18, wherein the heated fluid flows from the second chamber to the first chamber due to the pressure difference between the heated fluid in the first chamber and the heated fluid in the second chamber.

21. The method according to claim 18, wherein the separation means is a metal wall, and
wherein the method comprises reintroducing the heated fluid into the first chamber or into the second chamber, and prior to the reintroducing step, the method comprises: distributing the heated fluid according to a pattern by a distribution means, wherein the distribution means comprises a plate with holes; and wherein the pressure of the heated fluid upstream from the distribution means is higher than the pressure of the heated fluid downstream of the distribution means.

* * * * *